United States Patent [19]
Gesuale

[11] Patent Number: 6,019,565
[45] Date of Patent: *Feb. 1, 2000

[54] CONTAINER LIFTING AND TRANSPORT APPARATUS

[76] Inventor: Thomas Gesuale, 36 Landview Dr., Dix Hills, N.Y. 11746

[*] Notice: This patent issued on a continued prosecution application filed under 37 CFR 1.53(d), and is subject to the twenty year patent term provisions of 35 U.S.C. 154(a)(2).

[21] Appl. No.: 08/747,682

[22] Filed: Nov. 12, 1996

[51] Int. Cl.[7] .................................................. B60P 1/64
[52] U.S. Cl. .................. 414/458; 414/495; 414/917; 254/10 R; 280/47.34; 280/43.23
[58] Field of Search ..................................... 414/495, 539, 414/917, 458, 459, 460, 461; 254/10 R, 10 C; 187/274, 211; 280/47.34, 47.11, 86, 43.17, 43.23

[56] References Cited

U.S. PATENT DOCUMENTS

| | | | |
|---|---|---|---|
| 3,051,340 | 8/1962 | Ely | 414/495 |
| 3,083,850 | 4/1963 | Owen | 414/458 |
| 5,083,892 | 1/1992 | Oswald et al. | 414/458 |
| 5,281,073 | 1/1994 | Gesuale . | |
| 5,678,977 | 10/1997 | Nordlund | 414/458 |

FOREIGN PATENT DOCUMENTS 540755  1/1977  U.S.S.R. ................. 414/495

*Primary Examiner*—Frank E. Werner
*Attorney, Agent, or Firm*—Ike Aruti, Esq.

[57] ABSTRACT

An apparatus is provided for the longitudinally aligned lifting and manipulation of bulk material containers having apertured or tapered bases, or horizontally oriented ribs, or external peripheral lips on the sides thereof. The apparatus comprises a central frame having a pair of fork like elongate legs extending therefrom, and supporting wheels located at the central frame and at the distal ends of the legs. The legs are spaced sufficiently to straddle the base and simultaneously engage both sides of a container to be lifted, and lifting action achieved by a plurality of power rams which either extend the wheels more downwardly so that the legs and frame of the device are lifted with respect to the ground in con junction with tongues adapted to engage lifting apertures of the container, or by the upward extension of link bars which engage the side walls of a container so that the container is lifted with respect to the legs and frame of the device.

8 Claims, 5 Drawing Sheets

CONTAINER LIFTING AND TRANSPORT APPARATUS

CROSS REFERENCE TO RELATED APPLICATION

This application is a Continuation application of applicant's U.S. Ser. No. 08/747,682, filed Nov. 12, 1996, entitled Container Lifting and Transport Apparatus, now abandoned.

FIELD OF THE INVENTION

The present invention relates to an apparatus for moving bulk material containers from one location to another, and more particularly, to a compact and inexpensive apparatus for the lifting and manipulation of large and heavy containers.

BACKGROUND OF THE INVENTION

Articles and devices for the transport and management of bulk material are well known, and take many forms. It is quite typical for these bulk materials to be put upon or within articles such as pallets and containers for transport or storage. These containers are often quite large to make transport of the bulk material more economical, and are commonly outfitted with receiving apertures at the base thereof for engagement and manipulation by devices such as forklifts, or other large, specialized and expensive equipment.

The articles and devices have heretofore had wide usage in factories and processing plants for holding raw materials, transporting material from one processing stage to the next, holding quantities of parts to be assembled into larger assemblies, and in the trucking and railway industries for transporting raw materials from their place of acquisition to the factories and processing plants, and bringing more finished goods to users and distributors. After these goods have been used, a significant portion of the goods, waste products from its usage or consumption, as well as individual packaging and other materials provided therewith become refuse or waste, and again must be accumulated and transported for processing.

In recent times, environmental and health concerns have significantly changed the manner in which most items are discarded. For instance, with the current trend towards recycling, certain goods deemed recyclable should be separated from other goods so that they may be delivered to the proper recycling plant. Everyone from individual consumers to industrial giants are now compelled or at least strongly encouraged to separate their waste products. Paper type refuse must be separated for recycling, as is the case with glass, metal, and plastic. Health care industries must now separate sharps waste and biological waste for incineration in addition to the aforementioned materials. Many of these separated materials are to be sub categorized and separated again when they reach a waste processing sub station. Biodegradable wastes remaining after processing or separation must be brought to landfill areas for burial. Each of these materials require a separate bin for accumulation until a substantially full load is achieved whereupon it will be dispatched appropriately for the next stage of processing.

Correspondingly, at virtually every level above the consumer, there has been a prolific increase in the use of large, open top containers for the accumulation and transport of these refuse materials. Nestable, tapered bottom containers have recently become popular, as taught by Gesuale in U.S. Pat. No. 5,281,073, incorporated herein by reference as if more fully set forth, enabling the efficient transportation and storage of such containers when empty, and as a means for management of the increased bulk material container population. Besides having side walls which taper inwardly from top to bottom, a feature common to these and other open top material containers is one or more external ribs, peripheral lips or rims which strengthen or support the container or portions thereof.

Therefore, where waste management was once a simple affair directed to gathering waste products for disposal, it has now become a handling intensive affair involving bulk material containers which can present considerable difficulty for those entities not having access to forklifts and other similarly expensive devices and material handling equipment.

Furthermore, such bulk material containers commonly used at construction sites, storage containers, pallets, and the like may also be used to store items other than refuse, such as wallboard and other construction supplies. While certain heavy equipment is usually present at construction sites, forklifts and the like may only be present at larger construction sites.

Thus, in areas just above the consumer level, such as apartment buildings, business parks, and the like, refuse collection may require significant handling and management. For instance, designated storage containers may be located near buildings so that the proper items may be deposited in the proper containers. These containers may than need to be moved from building to building or from a building to a holding site until they are full, and then moved again to a particularly accessible location for pickup by an appropriate trucking service or the like. They may likely need to be manipulated within close quarters, such as alleys, driveways, and the like, since much of this activity is now being carried out by entities that never anticipated the need for space necessary to accumulate multiple types of waste.

A common size for such bulk material containers is approximately twenty feet long by eight feet wide so as to hold a sufficient quantity of material to make transport economical, and because that configuration is well suited for carrying by box and flatbed type tractor trailer trucks and railway cars. Because of the length and weight of such containers with their contents, it has been impractical to carry them in a longitudinal orientation using conventional forklifts, since a considerable center of mass could be positioned sufficiently far ahead of the front wheels of the forklift to cause the forklift to tip forwardly. Such a situation could require a larger and more expensive forklift than would otherwise be necessary, or attachment of ballast to the back of the forklift resulting in diminished capacity of the forklift by the amount of ballast attached. Accordingly, these larger bulk material containers have their apertures for receiving forklift blades located so that the bulk material containers are oriented transversely to the forklift for lifting and carrying, thereby placing the center of mass of the load closer to the forklift, and making such moment type overloading and consequent tipping less likely.

While some smaller storage containers are designed to be mobile, the majority of containers which are intended to store items of significant weight are designed to be stationary, since a container full of construction debris is unlikely to be able to be pushed around manually by an individual. Insurance liability is also a consideration with storage containers since they could present a significant danger if they become loose. Accordingly, most of these articles for carrying bulk materials are usually not equipped with wheels, except occasionally at one end to allow heavy handling equipment to drag and reposition the container for pickup. In such cases, the wheels do not particularly enhance the mobility of the container, since a large and specialized piece of equipment is already necessary to lift one end of the container. Rather, the wheels on such a container are primarily valuable for minimizing the damage caused to any flooring or pavement below during such dragging and repositioning operations.

Very often, it is desirable to transport these containers within enclosed vehicles. This can be to protect the environment from the contained materials, which may be particularly malodorous, or simply to prevent the materials from falling out and littering the nearby landscape. On the other hand, enclosed transport of these containers may be equally desirable to protect the contained materials from the environment, especially where the contained materials are foodstuffs, such as grain or even coffee beans as examples. The longitudinal orientation of these containers within truck or railway car bodies, and the typical lack of space around the containers leaves only the rearward end of the container accessible. This requires that they be manipulated from the accessible end, and prevents the necessary transverse approach of a forklift, as described above, to engage and lift the container for carrying and unloading. Accordingly, this often means the containers are dragged across the floor when loaded and unloaded from their enclosed transport bodies, and this can quickly destroy the floors of these bodies.

Tn the cases of landfills, where many such bulk material containers are sent, the nature of the operations are temporary. A hole will be dug, the transported refuse material put into the hole, and after covering over the material, the process repeated at another location. While these temporary locations will typically have backhoes, end loaders and the like for digging and burial operations, loading docks and similar platforms necessary for the transfer of these large bulk material containers to and from transporter bodies are rare. Thus, more specialized and expensive equipment, like dump trucks, must be used. A similar situation lacking the advantage of such loading docks and platforms exists in the cases of agricultural products, where after completion of harvesting in one typically undeveloped area, the operation moves to another undeveloped area. Consequently, there are many applications that could otherwise take advantage of the usage of relatively inexpensive containers instead of methods using specialized, more expensive equipment, if not for the difficulty loading, unloading and manipulating of such containers.

Present methods to move storage containers short distances such as from building to building in a business park, shopping center, apartment complex, or the like, in the best cases include the use of forklifts and other like apparatus. However, as mentioned above, even if useable under the circumstances, forklifts and the like are expensive, and they require qualified individuals to operate them. While large factories and processing plants typically have such forklifts and the like, a need exists for a less expensive and more highly maneuverable apparatus better able to lift, manipulate and transport such bulk material containers.

OBJECTS AND ADVANTAGES

It is therefore an object of the instant invention to provide an apparatus for moving bulk material containers from one location to another.

Another object of the present invention to provide an apparatus which less expensively takes the place of a forklift.

It is another object of the present invention is to provide an apparatus which is able to laterally engage a bulk material container without need for sufficient space to laterally approach such container.

Yet another object of the present invention is to provide an apparatus which can lift and carry bulk material containers in a longitudinal orientation.

A further object of the present invention is to provide an apparatus for lifting and manipulating a bulk material container which is more highly maneuverable than a forklift.

Still another object of the present invention is to provide an apparatus which can insert or remove a bulk material container from an enclosed transport body without dragging the container across or otherwise damaging the floor of the transport body.

Yet another object of the present invention is to provide an apparatus able to engage a bulk material container by an external lip, rim or other external horizontally oriented protrusion of the container.

Other objects and advantages of the present invention will become apparent to those of skill in the art upon contemplation of the disclosure herein in conjunction with the drawings.

SUMMARY OF THE INVENTION

The instant invention provides an apparatus for the lifting and moving of bulk material containers having apertured bases as if for engagement by a forklift, or alternatively, for bulk material containers having tapered bottoms or external horizontal projections such as formed by a peripheral lip. The device comprises a mobile frame having a pair of elongate, fork like legs spaced sufficiently apart to straddle the base of a bulk material container. The frame is outfitted with wheels at the central frame and at the distal ends of the fork like legs. Engagement and lifting mechanisms arranged on said fork legs take the form of spring loaded, laterally pivotable tongues adapted to vertically lift a container base in conjunction with downwardly pivotable wheels, or alternatively, with upwardly extendible horizontally oriented parallelogram links adapted to engage the tapered side or bottom walls or external horizontal protrusions of a container. Telescoping power rams are employed to lift the container from contact with the ground, either by pivoting the wheel assemblies downwardly, or by upwardly extending a the horizontal parallelogram links to contact and lift the tapered side or bottom walls, or engage external horizontal protrusions of a container, which may then be moved about upon the wheels of the frame.

BRIEF DESCRIPTION OF THE DRAWINGS

In the drawings, wherein the same reference numeral indicates the same element throughout the several views.

DETAILED DESCRIPTION OF THE PREFERRED EMBODIMENTS

Figure 1:
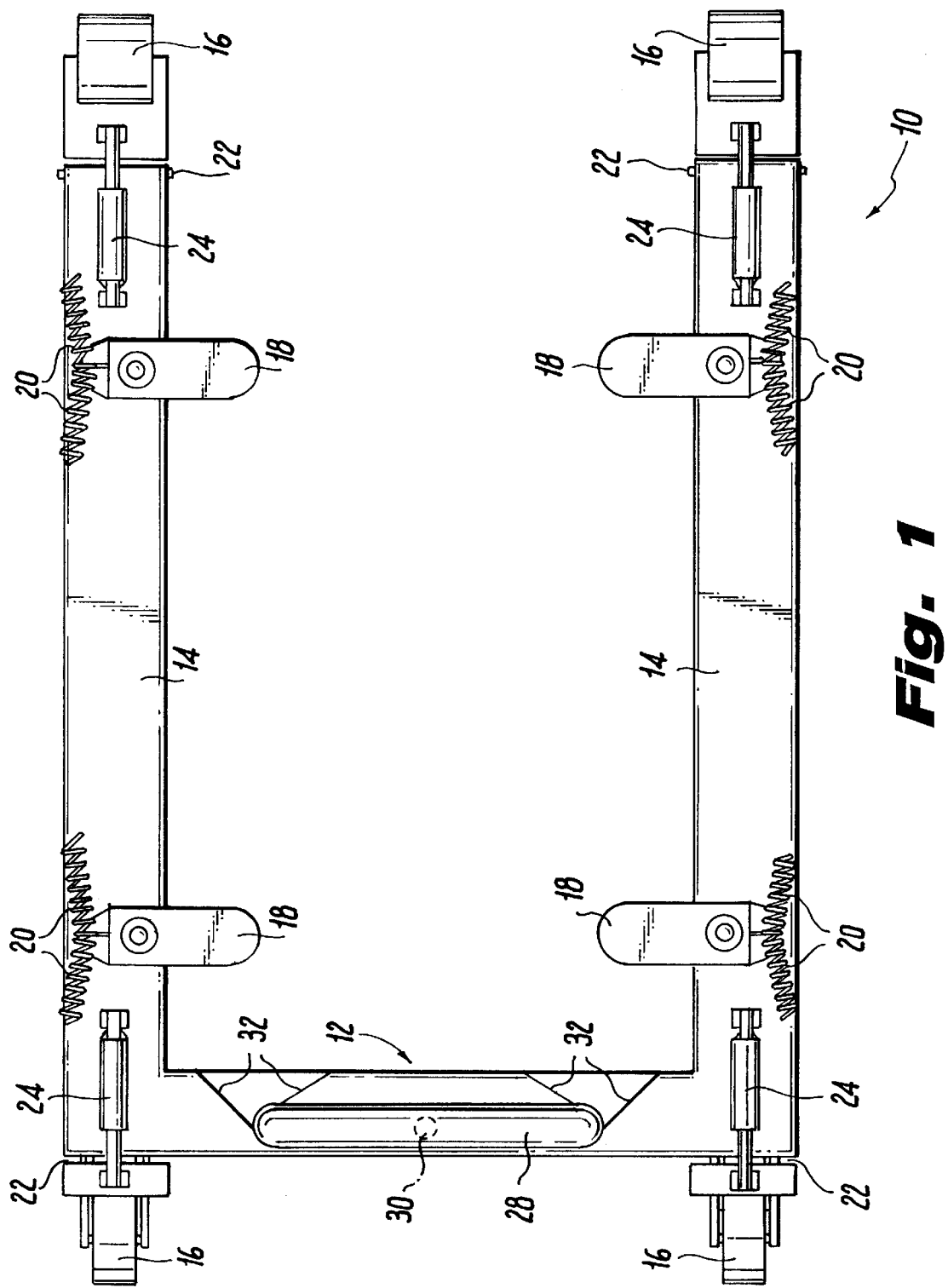
FIG. 1 is an overhead view of a first embodiment of the container lift of the instant invention, having spring loaded container engagement tongues, for use with pallets or other apertured base material containers.

Next, description will be given with respect to the preferred embodiments of the present invention by referring to the drawings.

(1) Configuration and Operation of First Embodiment

A first embodiment of the present invention, a movable container lift 10 for lifting and rolling a bulk material storage container from one location to another, is shown in FIG. 1. The apparatus comprises a movable frame with a central frame portion 12, and a pair of spaced, fork like legs 14 extending longitudinally therefrom. The frame is outfitted with a plurality of wheels 16 which are located at the extremities of each of the legs 14, and at the central frame 12. While a single wheel assembly may be adequate to support the central frame 12 if positioned centrally thereon, the best mode of practicing the instant invention contemplates the use of two wheels at the central frame end so that a wheel 16 is located at each of the four corners of container lift 10, and roller type wheels are deemed preferable by reason of their increased bearing surface area and higher load capacity for larger executions of the apparatus are contemplated for carrying large, heavily loaded containers.

The area between the distal ends of legs 14 open, the open area being sufficiently sized so that the movable frame may be slid to substantially surround the apertured base of a pallet or other bulk material container. Tongues 18 are pivotably mounted to the fork like legs 14, which can be aligned with the lifting apertures at the base of the storage container when the storage container is surrounded by the movable trailer. The tongues 18 are configured to extend inwardly into the open area between fork like legs 14 when at rest, and pivot horizontally about a vertical axis, and out of the way when contacting interfering base structure as the movable frame is being slid so as to surround the base of a storage container. However, when the tongues 18 on the movable frame and the lifting holes on the storage container are in alignment, the tongues are designed to automatically snap back to their rest position and into the lifting apertures under impetus of tongue springs 20 connected thereto, and remain in this position until oppositely withdrawn. This automatic tongue locating feature may be accomplished via any number of ways which will be obvious to those of skill in the art, however, for factors such as cost, reliability, and ease of construction, tension springs 20 anchored to legs 14 on both sides of each tongue 18 are deemed preferable at the time of this writing.

Figure 2A:
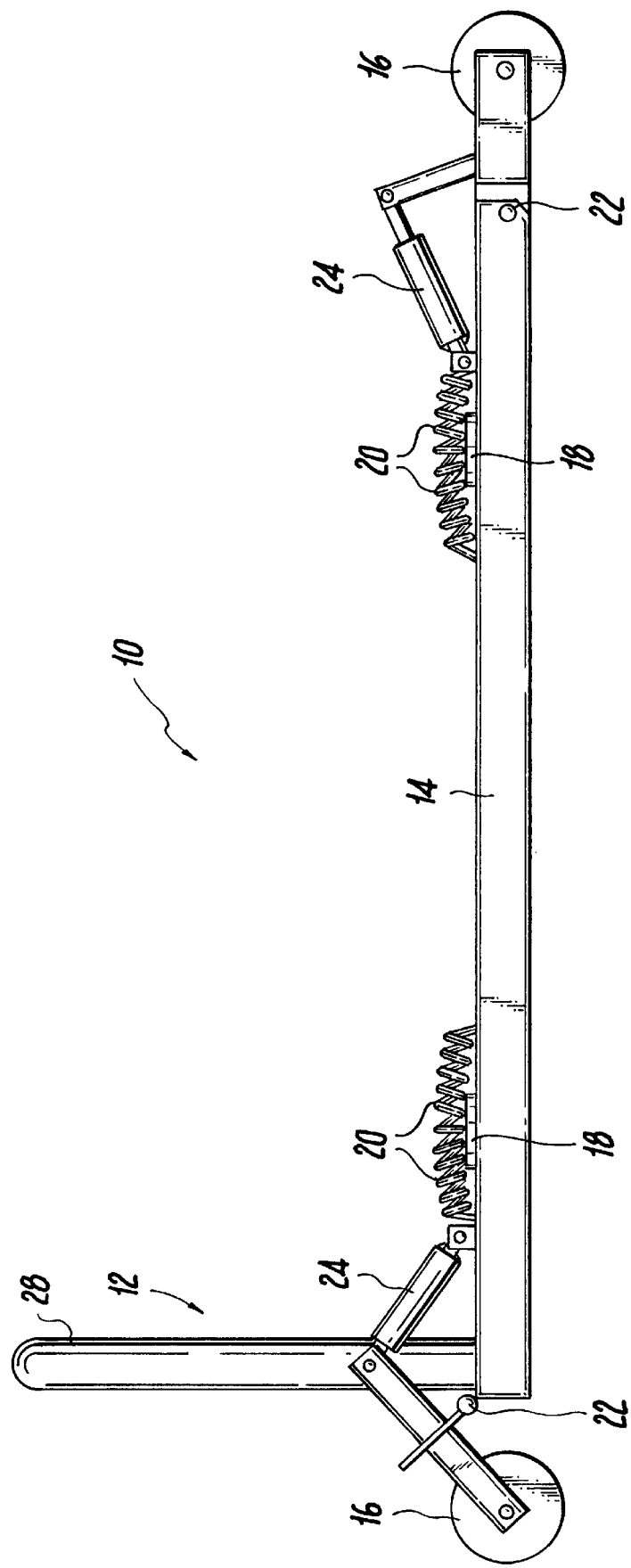
FIGS. 2a & b are side views of the apparatus of FIG. 1, illustrating one of the fork like legs equipped with pivotable wheel lifting means, and the operational positions of the pivotable wheels.

Turning now to FIGS. 2a & b, it can be seen that wheels 16 are pivotably mounted to the frame of the apparatus by means of hinge like mechanisms 22, with power rams 24 coupled between the wheel assemblies 16 and the frame of the apparatus. Power rams 24 may take the form of hydraulic, electrical or pneumatic linear actuators or their equivalents, and likewise are deemed to include the necessary pumps, power supplies, lines, and controls, (not shown,) as appropriate for the type of power ram selected, hydraulics cylinders being deemed preferable for reasons of available force, cost, and ease of application. Alternatively, the lines may be provided with quick connectors for coupling to external controls and power sources, presumably located in the vehicle which will be used to push or tow the apparatus, this method being deemed preferable for larger sized execuctions of the instant invention.

Figure 2B:
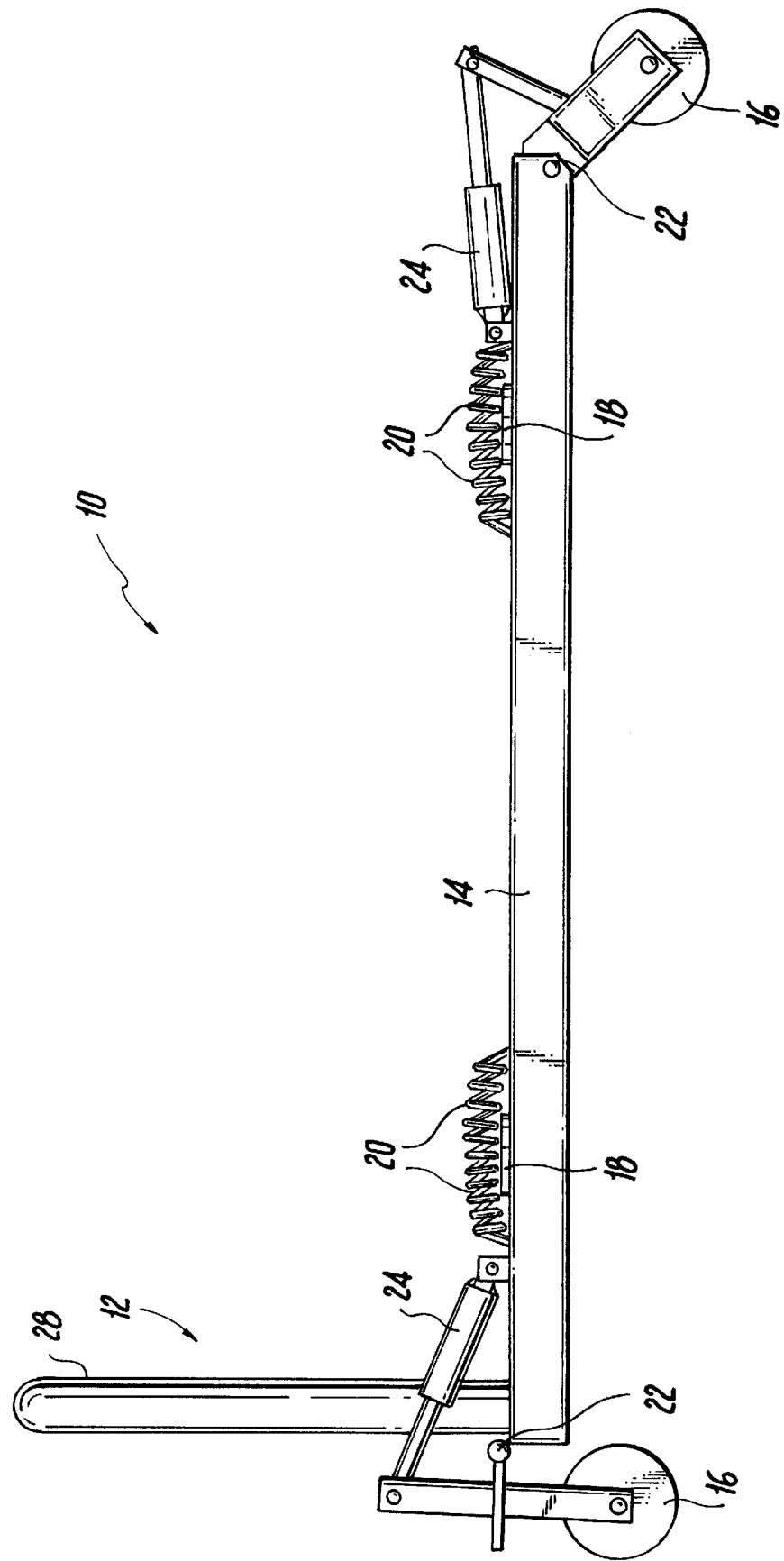

When the appropriate controls are operated to extend power rams 24 from the shown position in FIG. 2a, wheel assemblies 16 are forced to rotate about hinge like mechanisms 22, to a lower position with respect to the remainder of the frame of the apparatus, as shown in FIG. 2b. This, in turn causes the entire frame to be raised with respect to the ground. Where a bulk material container's lifting apertures have been engaged by the tongues 18 as described above, the tongues support the vertical load of the container, and the container or pallet is likewise lifted from the ground along with the frame, and the apparatus and container may then be rollingly pushed, pulled, or otherwise manipulated about upon wheel assemblies 16. Upon arriving at the desired location, the power rams 24 may then he retracted, causing the wheels to be raised and frame correspondingly lowered back to the position of FIG. 2a, the tongues 18 disengaged as the carried container again contacts and is supported by the ground, and the instant invention slid longitudinally away from around the base of the container, with tongues 18 rotating again out of the way against the force of springs 20, to allow the container to remain in the new location.

Central frame portion 12 is provided with manipulation structure 26 comprising a raised hoop 28 and depending pin 30, which may be engaged for pushing, pulling, or manipulating, and provides a structurally secure location for connecting straps, chains, ropes, fifth wheel type receivers, which, in turn, are connected to a vehicle of sufficient power to move the loaded container lift of the present invention. The hoop 28 of the manipulation structure may even be engaged with the shovel of a back hoe, end loader or the like, or in the cases of smaller executions of the apparatus, by small utility vehicles, or even the hands of people. For the larger, most commonly expected executions of the present invention, gussets 32 are provided for reinforcement of manipulation structure 26. The illustration of manipulation structure 26 is not intended to the exclusive, and the usage of other connection means for towing which are heretofore known or subsequently developed are likewise contemplated for integration with the invention as may be appropriate for the application. Swiveling type casters are also deemed preferable for one or more of wheel assemblies 16 for most applications to provide increased mobility. Means for adjustment of the distance between fork like legs 14 is also contemplated for use with the present invention where significant variation is expected in the dimensions of containers to be handled, and may be implemented in substantially the same manner as adjustable forklift tines, or similarly to means used for adjustment of support pedestals upon large machine bases as used in balancing machines and the like. Likewise, fork like legs legs 14 may be made of multiple segments, telescopically moveable so that containers of differing degrees of length or aperture separation may all be accommodated.

From the above descriptions it call be appreciated that the instant invention engages and lifts a container from both sides of the container simultaneously while approaching the container from the end, such that very little clearance is needed around the sides of the container having the lifting apertures. This results in increased maneuverability over traditional forklifts, by eliminating the need for both transverse approach and carrying orientations. Consequently, the instant invention is able to carry bulk material containers through narrower passageways than heretofore possible with a forklift, and is particularly well suited to the task of insertion and extraction of bulk material containers from enclosed transport bodies, as described above, without need for destructive dragging or scraping against the floor of the transport body.

(2) Configuration and Operation of Second Embodiment

Figure 3A:
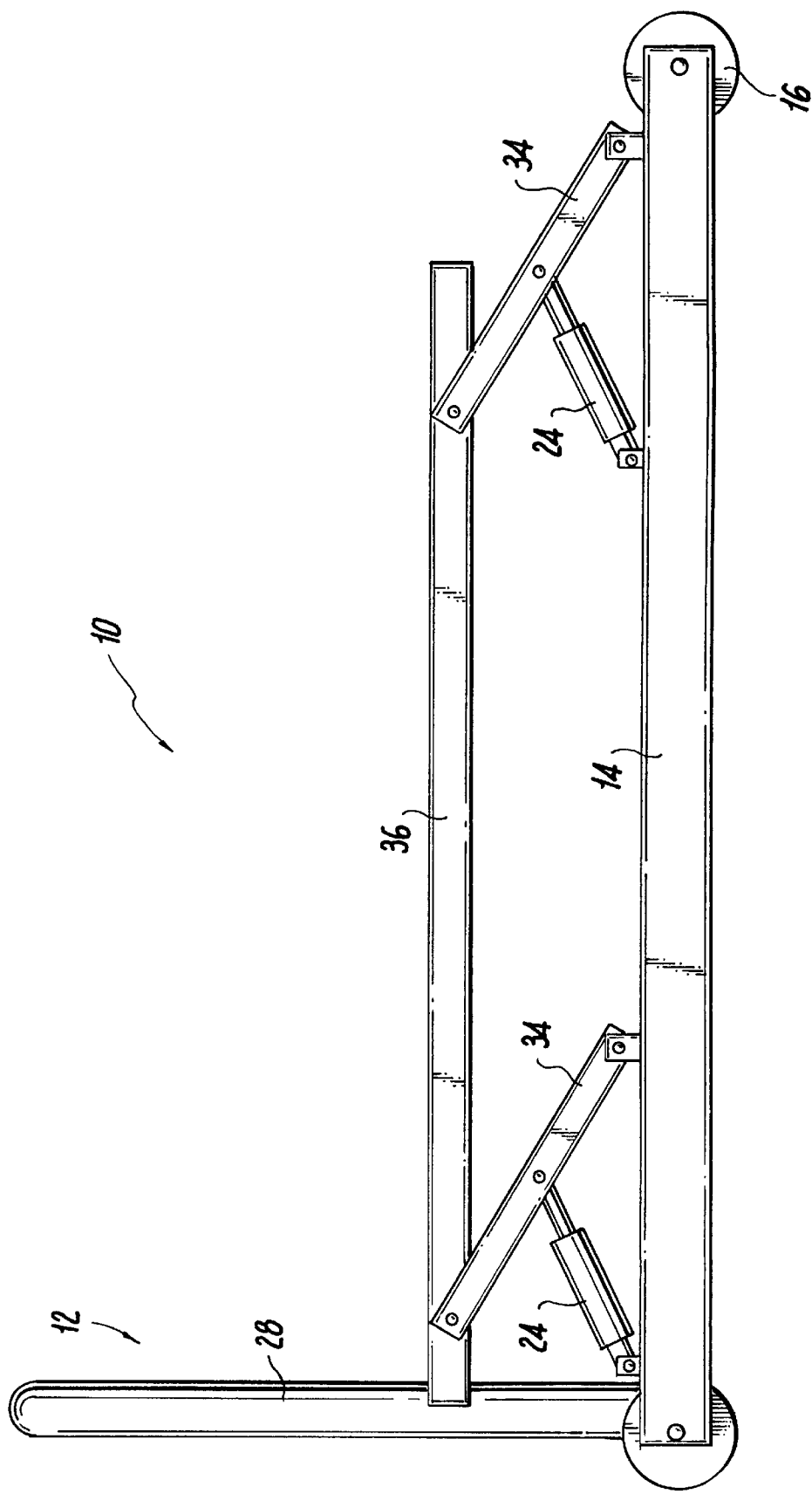
FIGS. 3a & b are side views of an alternative embodiment of the container lift of the instant invention, having parallelogram link lifting means for use with containers with tapered bottoms or external peripheral lips, arid showing the operational positions of the parallelogram links.

A second embodiment of the present invention, a movable frame for rolling a tapered or externally embellished bulk material container from one location to another, is shown in FIGS. 3a & b. As above, a movable frame 10 is shown, comprising a central frame 12 and a pair of spaced, fork like legs 14 extending longitudinally therefrom. The frame is outfitted with a plurality of wheels 16 which are located at the extremities of each of the legs 14, and at the central frame 12. The area between the distal ends of legs 14 is open, the open area being sufficiently sized so that the movable flame may be slid to substantially surround the lower portion of a bulk material container having either a tapered side or bottom walls, or external horizontal protrusions, grooves, or to like such as stiffening ribs or a peripheral lip.

Figure 3B:
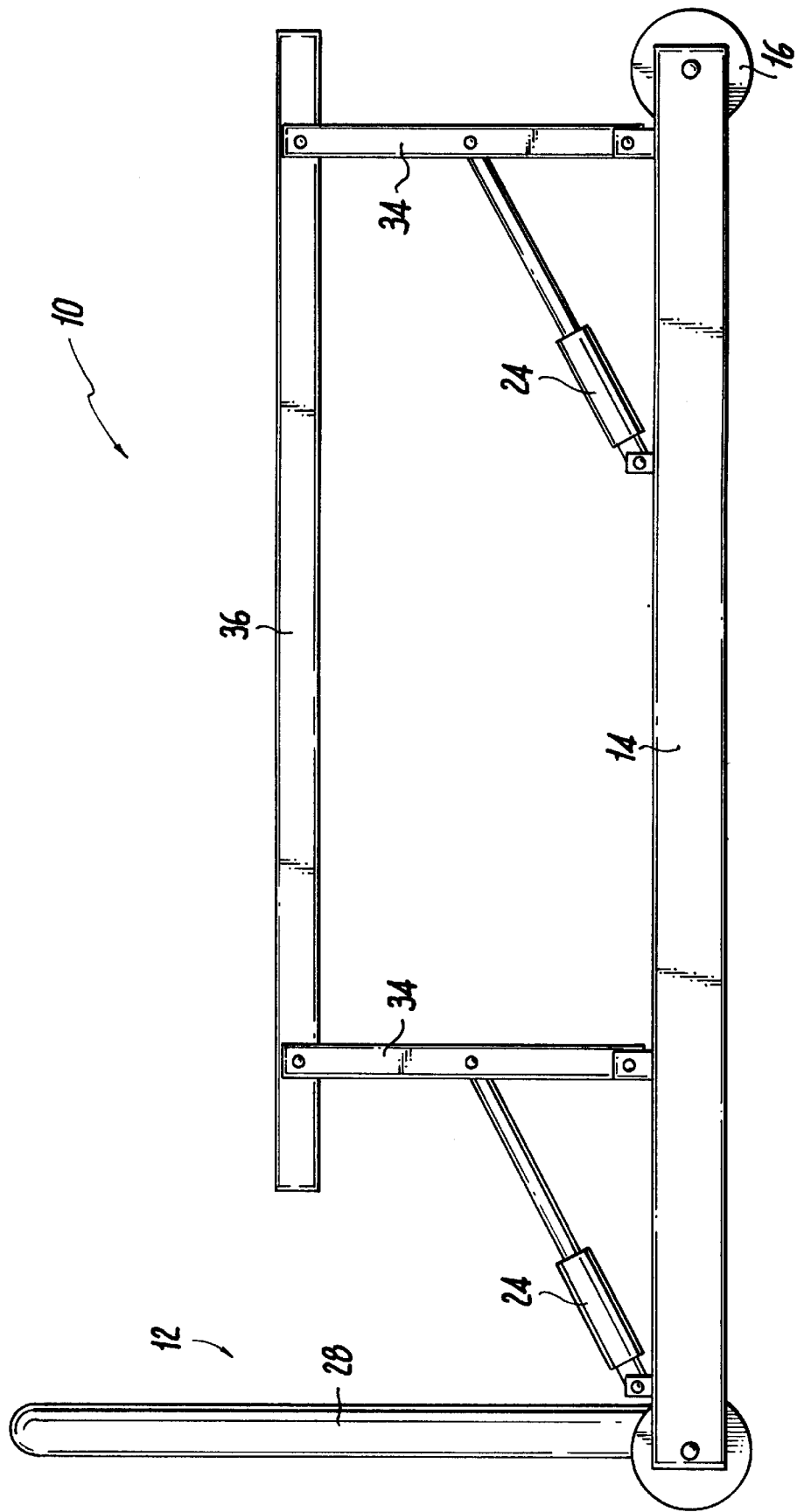

A plurality of lift arms 34 are pivotably mounted by their lower ends to each of the fork like legs 14 of the moveable frame. The upper ends of lift arms 34 are pivotably coupled to a horizontally oriented support bar 36. Power rams 24 are pivotably mounted at their lower ends to each of the fork like legs, and the lapper ends of the power rams are pivotably mounted to lift arms 34 so that when power rams 24 are actuated to change length, lift arms 34 traverse an arcuate path radialy about their lower pivot point. This causes horizontal support bars 36 of each fork like leg to move upwardly and downwardly in parallelogram fashion by the force of the associated power ram. It should be noted the illustration of FIGS. 3 depicts a power ram 24 couple to each lift arm 34, which is the best mode contemplated for maximizing the lifting capacity of the container lift of the present invention, although only a single power ram is necessary parallelogram structure.

In operation, the frame of the instant invention is slid so as to surround the container, the horizontal support bars 36 are in a down position, as shown in FIG. 3a. However, after the frame has been positioned around the base of the container, power rams 24 are actuated to cause horizontal support bars 36 to be raised to the position shown in FIG. 3b. Upon contacting the inclined walls of the container, or horizontal ribs or peripheral lip, power rams 24 are further actuated to cause horizontal support bars 36 to support the container and further to lift the container off the ground so that the trailer and container can be rolled to another location.

The illustrations of FIG. 3a & b, in their two dimensionality, seem to show horizontal support bars 36 moving to an upper position vertically above their lower position excepting thier longitudinal displacement, however, it may be advantageous in some applications to mount lifting arms 34 and power rams 24 at an angle of inclination toward each other, so that horizontal support bars 36 converge as they move toward, their upper position while remaining substanitially parallel, so that contact with the container to be lifted is made more quickly and securely.

While the above description contains many specificities, these should not be construed as limitations on the scope of the instant invention, but rather as an exemplification of the preferred embodiments thereof. Accordingly, the scope of the instant invention should not be determined by the embodiments shown, but rather by the claims appended hereto and thier legal equivalents.

What is claimed is:

1. An apparatus for movinq a bulk material container, which comprises:

a frame movably mounted upon wheels, said frame having an elongate central portion, and a pair of elongate, substantially parallel fork like legs extending horizontally outward from said central portion of said frame, said wheels being located on said frame and subtantially at the extremities of said fork like legs, and said wheels being moveable by motive means between upper and lower positions with respect to said frame; and a plurality of tongues rotatively mounted about vertical axes and mounted to said frame, said tongues being connected to biasing means and being movable to and from positions extending substantially horizontally toward the area between said legs so that said tongues are able to engage the container resting on the ground when said frame is positioned so that the container is substantially between said legs with the wheels in the upper position, said tongues additionally being able to vertically support the container when said wheels are subsequently moved toward the lower position, so that a container may be lifted and rollingly moved about upon the wheels of said frame.

2. The apparatus as set forth in claim 1, wherein said wheels are mounted to extension structures, and said extension structures are pivotably mounted to said frame.

3. The apparatus as set forth in claim 2, further comprising hydraulic cylinders mounted between said frame and said extension structures so that said extension structures may be pivoted with respect to said frame, and said wheels resultingly moved between the upper and lower positions.

4. The apparatus as set forth in claim 1, wherein said central portion of said frame further includes structure by which said frame may be engaged and pushed, pulled, or moved.

5. The apparatus as set forth in claim 1, wherein said tongues are biased to a position extending toward the area between the legs of said frame.

6. The apparatus as set forth in claim 5, further including springs for biasing said tongues to a position extending toward the area between the legs of said frame.

7. The apparatus as set forth in claim 1, wherein said tongues are biased to a position extending into the area between the legs of said frame.

8. The apparatus as set forth in claim 7, further including springs for biasing said tongues to a position extending into the area between the legs of said frame.

* * * * *